United States Patent
Ito et al.

(10) Patent No.: US 6,582,599 B2
(45) Date of Patent: Jun. 24, 2003

(54) FILTER

(75) Inventors: Kouichi Ito, Sashima-gun (JP); Takashi Arai, Sashima-gun (JP); Hideo Kamo, Sashima-gun (JP)

(73) Assignee: Kyosan Denki Co., Ltd., Sashima-gun (JP)

( * ) Notice: Subject to any disclaimer, the term of this patent is extended or adjusted under 35 U.S.C. 154(b) by 0 days.

(21) Appl. No.: 09/906,687

(22) Filed: Jul. 18, 2001

(65) Prior Publication Data

US 2002/0017485 A1 Feb. 14, 2002

(30) Foreign Application Priority Data

Jul. 18, 2000 (JP) .......................... 2000-217980

(51) Int. Cl.$^7$ .......................... B01D 35/027; B01D 29/07
(52) U.S. Cl. .................. 210/416.1; 210/416.4; 210/487; 210/489; 210/493.1; 210/504
(58) Field of Search ................. 210/416.1, 416.4, 210/483, 484, 487, 488, 489, 492, 493.1, 499, 503, 504, 505

(56) References Cited

U.S. PATENT DOCUMENTS

| | | | | |
|---|---|---|---|---|
| 2,569,243 A | * | 9/1951 | Kovacs .................. 210/446 |
| 2,726,184 A | * | 12/1955 | Cox et al. ................. 156/69 |
| 3,315,336 A | * | 4/1967 | Parker et al. ............ 29/419.1 |
| 3,480,149 A | | 11/1969 | Houser |
| 3,633,756 A | * | 1/1972 | Buckman .................. 210/443 |
| 3,747,772 A | * | 7/1973 | Brown .................. 210/493.1 |
| 3,867,294 A | * | 2/1975 | Pall et al. ................. 210/489 |
| 4,033,881 A | * | 7/1977 | Pall ........................ 210/491 |
| 4,452,619 A | * | 6/1984 | Wright et al. ............... 55/521 |
| 4,589,983 A | * | 5/1986 | Wydevan .................. 210/317 |
| 4,600,511 A | | 7/1986 | Sherman et al. |
| 4,701,197 A | * | 10/1987 | Thornton et al. ............. 55/487 |
| 4,804,466 A | | 2/1989 | Cooper et al. |
| 4,869,816 A | | 9/1989 | Markl |
| 5,055,187 A | | 10/1991 | Ito et al. |
| 5,494,575 A | | 2/1996 | Kitajima et al. |
| 5,527,569 A | * | 6/1996 | Hobson et al. ........... 428/316.6 |
| 5,584,988 A | * | 12/1996 | Hashimoto et al. ......... 210/136 |
| 5,630,940 A | * | 5/1997 | Van Rossen et al. ........ 210/484 |

FOREIGN PATENT DOCUMENTS

EP 0 743 445 11/1996

* cited by examiner

Primary Examiner—David A. Simmons
Assistant Examiner—Fred Prince
(74) Attorney, Agent, or Firm—Oliff & Berridge, PLC

(57) ABSTRACT

A filter is composed of a filter member forming at least two opposed faces, an inner space surrounded by the filter member for accumulation of a liquid, and a coupling member establishing communication between the inner space and the outside to discharge the liquid in the inner space to the outside. The liquid flows through the filter member, is thereby removed of foreign matters, and is discharged via the coupling member. Convexo-concaves are provided on at least one face of the filter member.

23 Claims, 11 Drawing Sheets

FILTER

BACKGROUND OF THE INVENTION

1. Field of the Invention

The invention relates to the structure of a filter and, more particularly, to the structure of an in-tank type fuel filter installed in a vehicular fuel tank.

2. Description of Related Art

Hereinafter, an in-tank type fuel filter installed in a vehicular fuel tank according to the related art will be described as an example. Note that the invention should not be limited to in-tank type fuel filters.

FIG. 16 shows a fuel tank 1 installed in a vehicle. A fuel pump 3 for delivering fuel to a fuel injection system 4 is disposed in the fuel tank 1. A fuel filter 2 is attached to the fuel pump 3 at its upstream inlet via a coupling member 7. FIG. 17 shows details of the fuel filter 2. The fuel filter 2 is coupled with the fuel pump 3 via the coupling member 7, and abuts at the other end thereof on a bottom wall 9 of the fuel tank 1. Thus, even if the fuel level has decreased, a sufficient amount of fuel can be pumped up.

The fuel filter 2 is composed of a filter member 5 constructed of a mesh screen made from a synthetic resin and having a multitude of apertures formed therein, and of a protector 6 disposed inside the filter member 5. The protector 6 is made from a synthetic resin, offers a communication passage leading to the fuel pump 3, and prevents cohesion of the filter member 5.

Because the in-tank type fuel filter 2 as described above has the protector 6 inside, it is advantageous in that cohesion of the filter member 5 can be prevented, that a sufficient inner space 8 can be ensured, and that the fuel filter 2 can be installed with the filter member 5 pressed onto the bottom wall 9 of the fuel tank 1.

However, the fuel filter 2 has the following problems.

First of all, the overall weight and costs increase because of the protector 6.

Because of the structure wherein rigidity of the protector 6 is utilized to press the fuel filter 2 onto the bottom wall 9 of the fuel tank 1, the filter member 5 is apt to be abraded and thus is disadvantageous in terms of durability. Further, vibrations of the pump are conveyed via the protector 6 and cause discomfort to human bodies as harmful noise.

Furthermore, since a molded article made from a synthetic resin is used as the protector 6, the protector 6 tends toward deformation such as warp when soaked in fuel. The filter member 5 is also deformed simultaneously with the deformation of the protector 6, and decreases in durability as a result.

Furthermore, a corner portion of the protector 6 abrades the filter member 5 at a portion that is in contact with the bottom wall 9 of the fuel tank 1. This threatens to accelerate abrasion of the filter member 5 and make it useless.

Further, since the mesh screen of the related art is planar, the filtration area is limited even if it is used. The filter is inevitably enlarged if an attempt has been made to increase the filtration area and prolong the period of endurance.

SUMMARY OF THE INVENTION

It is thus an object of the invention to provide a filter that eliminates the inconveniences of a liquid filter such as the in-tank type fuel filter, that can be manufactured at low costs, that offers high durability, and that is compact in size.

To achieve the above object, according to a first aspect of the invention, there is provided a filter comprising a filter member forming at least two opposed faces, an inner space surrounded by the filter member for accumulation of a liquid, and a coupling member establishing communication between the inner space and the outside to deliver the liquid in the inner space to the outside, wherein the liquid is removed of foreign matters by passing through the filter member and is discharged via the coupling member. A plurality of convexo-concaves are provided on at least one face of the filter member. Due to this construction, even though the protector has been dispensed with, a sufficient inner space can be guaranteed and the filtration area can be increased.

DETAILED DESCRIPTION OF PREFERRED EMBODIMENTS

Figure 1:
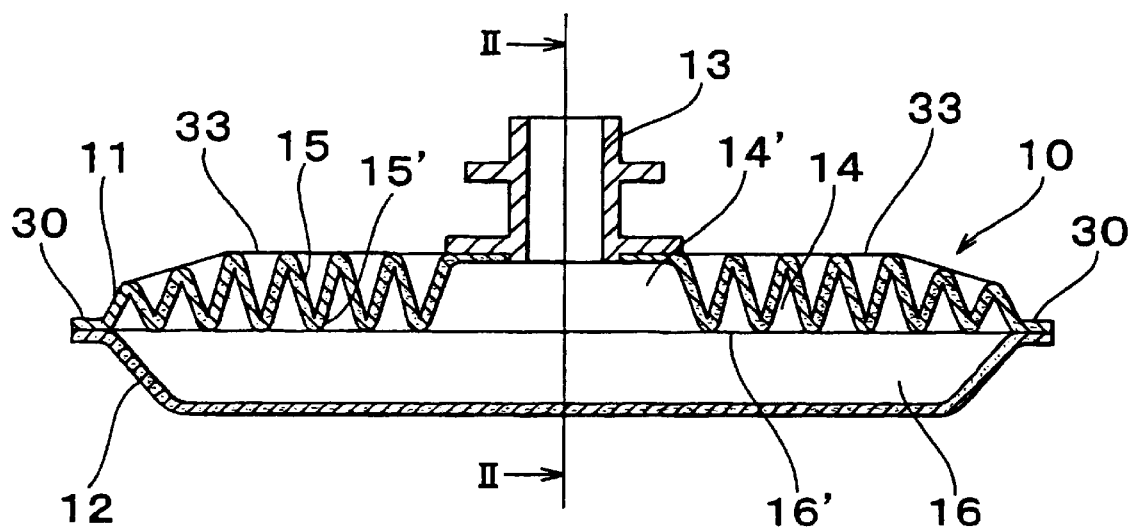
FIG. 1 is a cross-sectional view of a filter according to an embodiment 1 of the invention.
Figure 2:
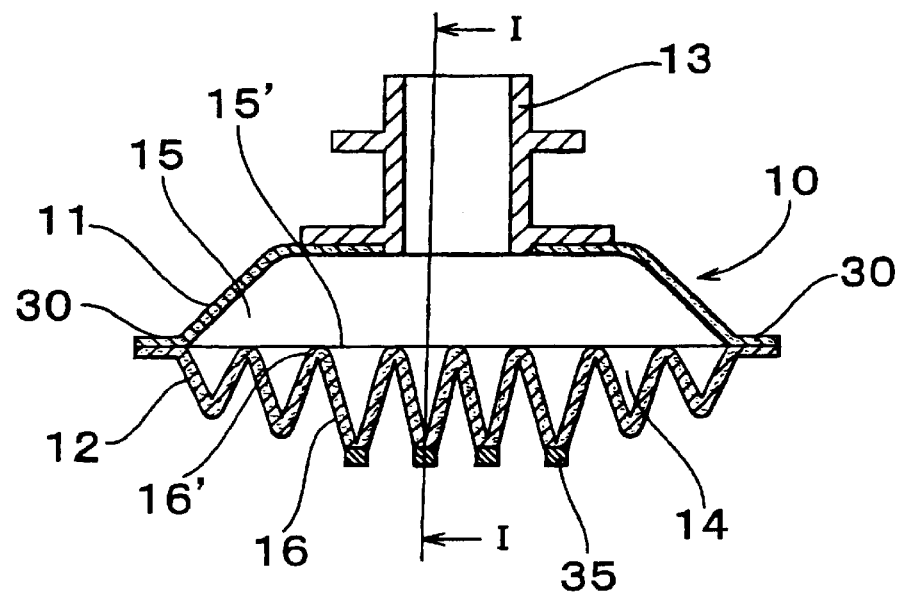
FIG. 2 is a cross-sectional view along a line II—II shown in FIG. 1.
Figure 3:
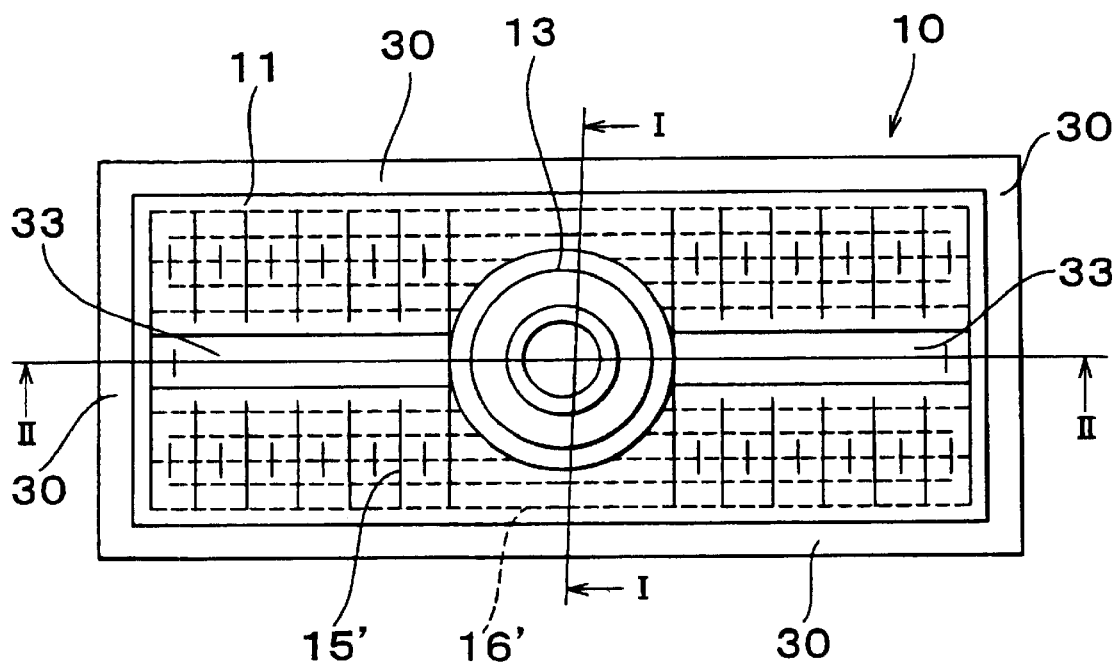
FIG. 3 is a plan view of the filter according to the embodiment 1 of the invention.

FIGS. 1 to 3 show the filter according to the embodiment 1 of the invention. FIG. 1 is a cross-sectional view of the filter. FIG. 2 is a cross-sectional view along the line II—II shown in FIG. 1. FIG. 3 is a plan view of the filter.

The invention will be described referring to an in-tank type fuel filter. A fuel filter 10, which is generally oblong in a plan view, is coupled with a fuel pump on its upstream side via a coupling member 13. The fuel pump is disposed in a fuel tank.

The fuel filter 10 is composed of an upper filter member 11 and a lower filter member 12. The filter members 11, 12 are made from filter paper, a non-woven fabric or the like. Peripheral portions 30 of the filter members 11, 12 are welded by a thermal welding means such as ultrasonic welding or electro-deposition or are glued by adhesives or the like, so that inner spaces 14 are formed inside the filter members 11, 12.

A plurality of convexo-concaves 15, 16 are formed e.g. by bending the filter members 11, 12. As is apparent from FIGS. 1 and 2, inner leading ends 15', 16' of the convexo-concaves 15, 16 abut on each other. As is apparent from FIG. 3, the inner leading ends 15', 16' are linear in a plan view and intersect with each other while being offset from each other by 90°. Although the inner leading ends 15', 16' of the convexo-concaves 15, 16 may simply abut on each other, they may be connected by thermal welding, adhesives or the like for the purpose of increasing rigidity. Note that the term "joint" in the present specification covers the concepts of simple abutment, connection by thermal welding, and so on.

Further, a convexo-concave-less central inner space 14' is formed in a central portion of the upper filter member 11. The coupling member 13 is connected with the upper filter member 11 in the central inner space 14' by thermal welding, adhesives or the like. The coupling member 13 is coupled at the other end thereof with the fuel pump.

Further, the upper filter member 11 is provided with a convexo-concave-less band-shaped passage 33 that extends in the longitudinal direction of the oblong, i.e., perpendicularly to the convexo-concave direction and that is symmetric with respect to the coupling member 13. The inner spaces 14 formed by the convex portions 15 of the upper filter member 11 communicate with the band-shaped passage 33. Further, the inner spaces 14 formed by the convex portions 15 of the upper filter member 11 also communicate with the inner spaces formed by the convex portions 16 of the lower filter member 16. Fuel that has entered the filter from the upper filter member 11 is delivered to the central inner space 14' via the band-shaped passage 33 and the lower inner spaces.

Further, the lower filter member 12 is provided with the convex portions 16 extending in the longitudinal direction of the oblong. The inner spaces 14 formed by the convex portions 16 communicate with the central inner space 14' at the center of the filter. Therefore, fuel that has entered the filter from the lower filter member 12 flows to the central inner space 14' through the inner spaces formed by the lower filter member. A part of the fuel is delivered to the central inner space 14' via the inner spaces 14 of the upper filter member.

Further, air that has entered the inner spaces 14 flows smoothly to the central inner space 14' via the band-shaped passage 33. The band-shaped passage 33 also serves to prevent air from accumulating in the inner spaces.

Although the inner leading ends 15', 16' of the convexo-concaves 15, 16 are offset from each other by 90° as shown in the drawings, the angle of intersection can be reduced within such a range that all the fuel that has entered the filter can flow to the central inner space 14' with which the coupling member 13 is coupled.

Furthermore, although the inner and outer leading ends 15', 16' of the convexo-concaves 15, 16 are linear in a plan view, they may be curved or zigzag. The filter members may not necessarily be oblong and may be square, circular and so on.

Further, the non-woven fabric is preferably the mixture of a raw fiber made from polyester, polypropylene, rayon, glass, acetate or the like and an adhesive fiber made from polyester, polypropylene, rayon, glass, acetate or the like.

The adhesive fiber is surface-coated with a low-boiling resin such as modified polyester, modified polyethylene, modified polypropylene or the like.

Because of the composition as described above, the fuel filter 10 is robust even though it is made only from filter paper or a non-woven fabric. Further, the surface area of the fuel filter 10 can be enlarged by providing a plurality of convexo-concaves. Also, since the convexo-concaves guarantee sufficient inner spaces, fuel that has entered the inner spaces 14 from the entire filter members 11, 12 flow smoothly to the central inner space 14'. As a result, the intake efficiency of the fuel pump can be enhanced.

Furthermore, buffer agents 35 composed of coagulated adhesives, plates and so on are provided on the outer leading ends of the convexo-concaves of the lower filter member 12 as shown in FIG. 2. By ensuring that the buffer agents 35 are interposed between the lower filter member 12 and a bottom wall of the fuel tank and that the lower filter member 12 does not come into direct contact with the bottom wall of the fuel tank, the lower filter member 12 is prevented from being abraded or damaged. Note that the buffer agents 35 are also applicable to the other embodiments.

Figure 4:
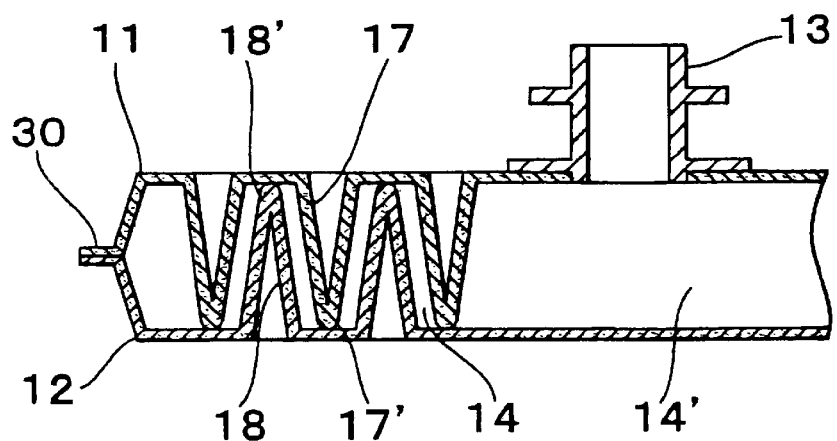
FIG. 4 is a cross-sectional view of a filter according to an embodiment 2 of the invention.
Figure 5:
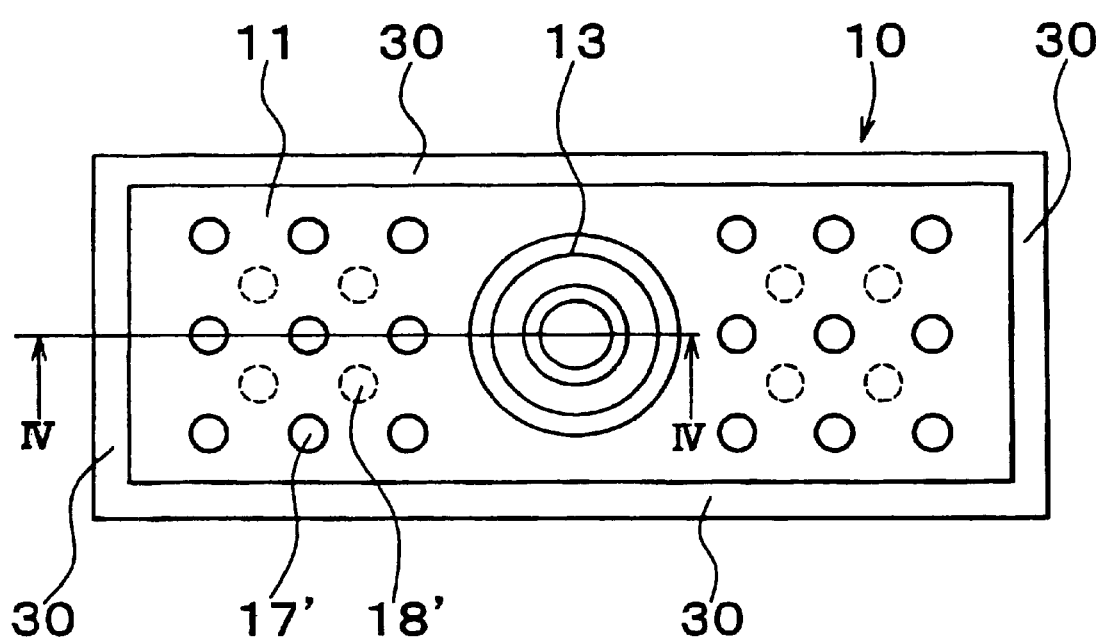
FIG. 5 is a plan view of the filter according to the embodiment 2 of the invention.

FIGS. 4 and 5 show the filter according to the embodiment 2 of the invention. FIG. 4 is a cross-sectional view along a line IV—IV shown in FIG. 5. FIG. 5 is a plan view.

The embodiment 2 employs a plurality of dimples instead of the convexo-concaves of the embodiment 1. In other respects, the embodiment 2 is identical with the embodiment 1.

That is, a plurality of dimples 17, 18 as conical recesses are formed e.g. by pressing a tang onto flat-sheet filter members made from filter paper, a non-woven fabric or the like. The oblong filter members are used as the upper and lower filter members 11, 12.

One of the filter members 11 (12) is superposed on the other filter member 12 (11) such that leading ends 17' (18') of the dimples 17 (18) of the one of the filter members 11 (12) abut on an inner surface of the other filter member 12 (11). If occasion demands, the abutment portions as well as the peripheral portions 30 are connected by thermal welding, adhesives or the like.

Regardless of the number of the abutment portions or the direction in which they are arranged, as is apparent from FIG. 5, all the fuel that has entered the inner spaces 14 flows smoothly toward the coupling member 13 via the central inner space 14'.

Although the inner spaces 14 have been slightly narrowed down, a compact and robust filter can be obtained.

Figure 6:
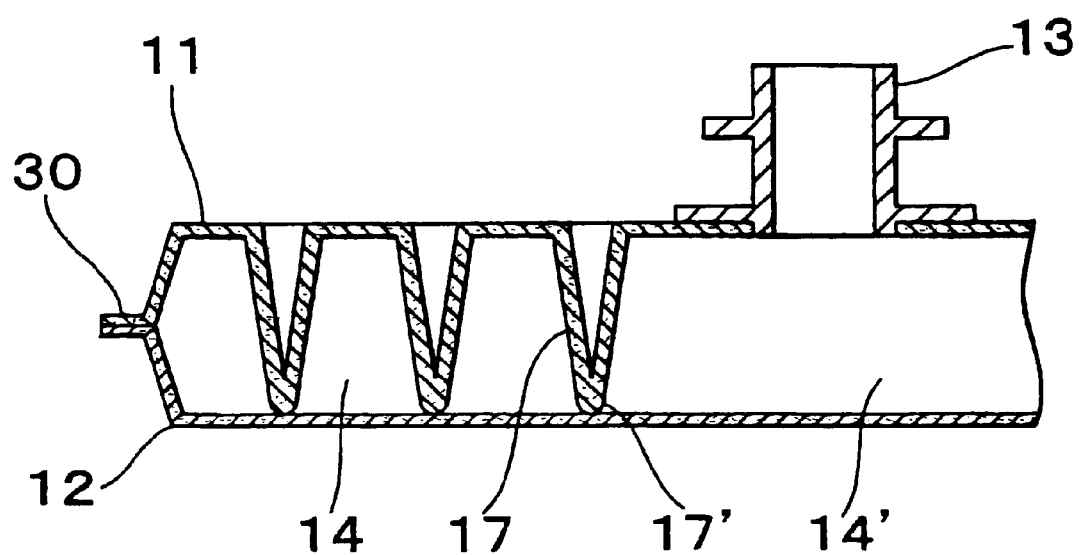
FIG. 6 is a cross-sectional view of the filter according to the embodiment 3 of the invention.
Figure 7:
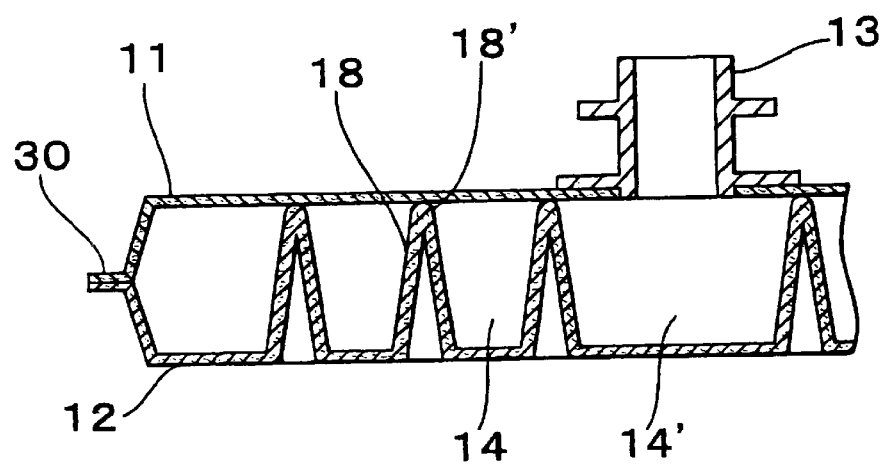
FIG. 7 is a cross-sectional view of a modified filter according to the embodiment 3 of the invention.

FIGS. 6 and 7 are cross-sectional views of the filter according to the embodiment 3 of the invention.

In the embodiment 3, although a plurality of dimples are provided as is the case with the embodiment 2, a plurality of dimples are provided only on one of the filter members. In other respects, the embodiment 3 is identical with the embodiment 2.

In the embodiment shown in FIG. 6, the upper filter member 11 is provided with a plurality of dimples 17, and leading ends 17' of the dimples 17 abut on an inner surface of the lower filter member 12. If occasion demands, the abutment portions and the peripheral portions 30 are connected by thermal welding, adhesives or the like.

In the embodiment shown in FIG. 7, the lower filter member 12 is provided with a plurality of dimples 18, and leading ends 18' of the dimples 18 abut on an inner surface of the upper filter member 11. If occasion demands, the abutment portions as well as the peripheral portions 30 are connected by thermal welding, adhesives or the like.

Although the filter of the embodiment shown in FIGS. 6 and 7 is slightly less robust than that of the embodiment 2, the inner spaces can be widened.

Figure 8:
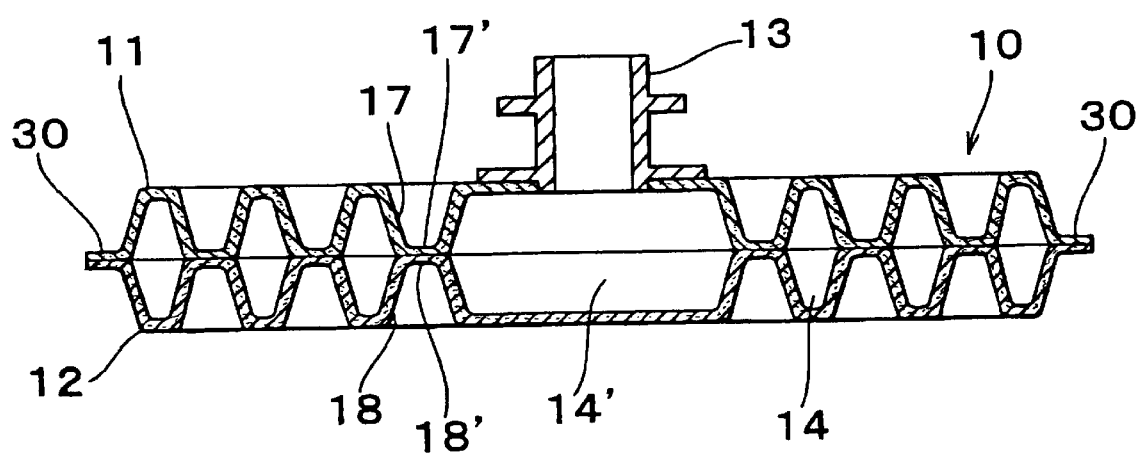
FIG. 8 is a cross-sectional view of a filter according to an embodiment 4 of the invention.
Figure 9:
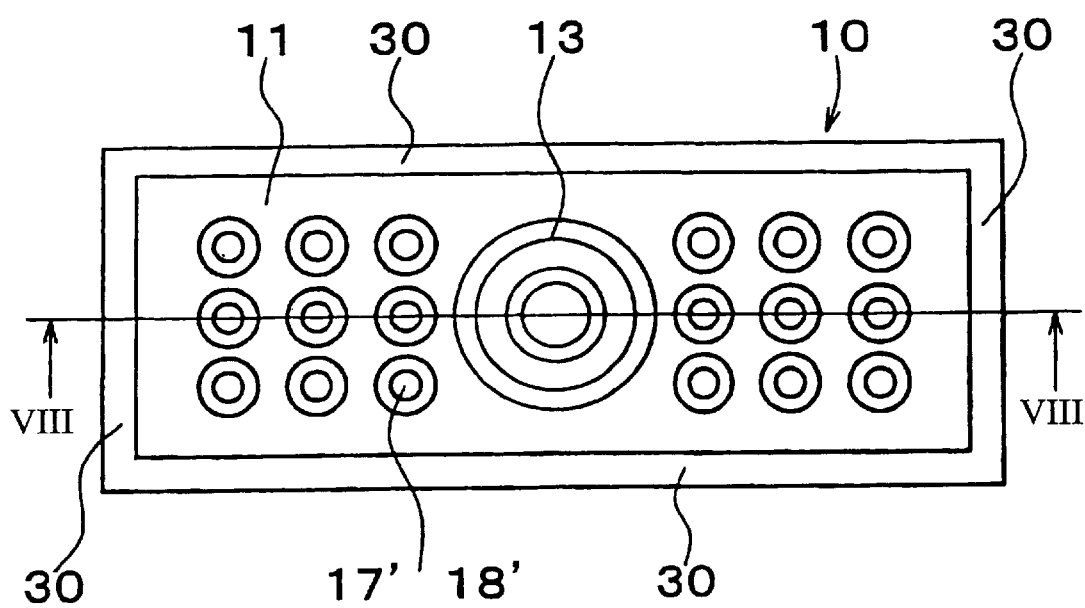
FIG. 9 is a plan view of the filter according to the embodiment 4 of the invention.

FIGS. 8 and 9 show the filter according to the embodiment 4 of the invention. FIG. 8 is a cross-sectional view along a line VIII—VIII shown in FIG. 9. FIG. 9 is a plan view.

In the embodiment 4, although a plurality of dimples are provided as is the case with the embodiment 2, the abutment portions of the leading ends of the dimples are different from those of the embodiment 2. In other respects, the embodiment 4 is identical with the embodiment 2.

That is, the upper and lower filter members 11, 12 are respectively provided with the same number of dimples 17, 18 of the same shape substantially at the same positions, and the leading ends 17', 18' of the dimples 17, 18 abut on each other. If occasion demands, the abutment portions as well as the peripheral portions 30 are connected by thermal welding, adhesives or the like.

Although the filter 10 has been increased in height due to such a construction, the inner spaces 14 can be widened in comparison with the embodiments 2 and 3.

Figure 10:
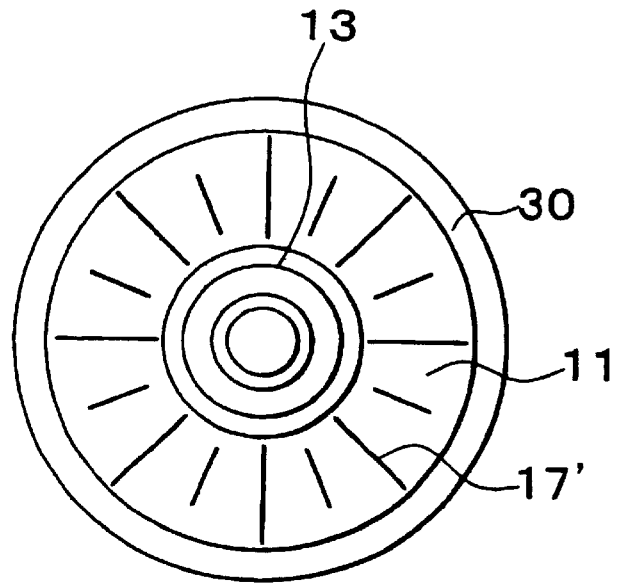
FIG. 10 is a plan view of a filter according to an embodiment 5 of the invention.
Figure 11:
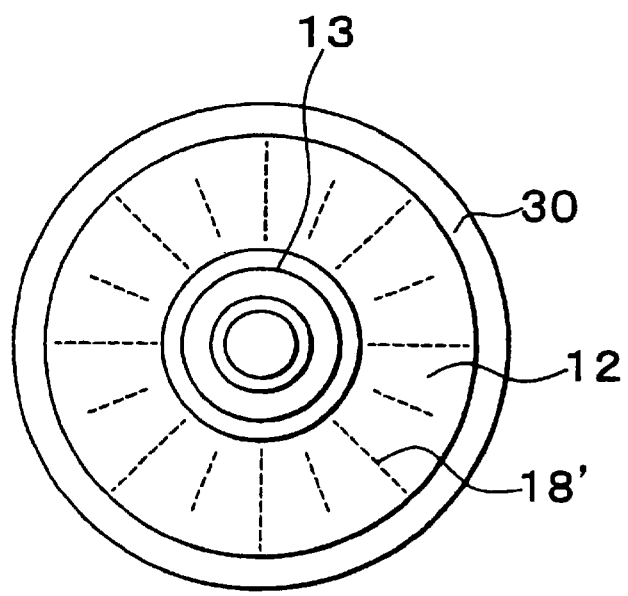
FIG. 11 is a plan view of a modified filter according to the embodiment 5 of the invention.

FIGS. 10 and 11 are plan views of the filter according to the embodiment 5 of the invention.

In the embodiment 5, the upper and lower filter members 11, 12 are in the shape of a circle stretching generally around the coupling member 13, and at least one of the filter members 11, 12 is provided with a plurality of radially extending convexo-concaves.

In the embodiment shown in FIG. 10, the upper and lower filter members 11, 12 are generally in the same shape, i.e., in a circular shape. The coupling member 13 is disposed at the central portion of the circle. A plurality of radially extending convexo-concaves are formed only in the upper filter member 11.

The inner leading ends 17' of the convexo-concaves formed in the upper filter member 11 abut on the inner surface of the lower filter member as is the case with the embodiments shown in FIGS. 4 and 6. If occasion demands, the inner leading ends 17' are connected by thermal welding, adhesives or the like. The peripheral portions 30 are connected by thermal welding or the like.

Further, in the embodiment shown in FIG. 11, the upper and lower filter members 11, 12 are generally in the same shape, i.e., in a circular shape. The coupling member 13 is disposed at the central portion of the circle. A plurality of radially extending convexo-concaves are formed only in the lower filter member 12.

The inner leading ends 18' of the convexo-concaves formed in the lower filter member 12 abut on the inner surface of the upper filter member 11 as is the case with the embodiments shown in FIGS. 4 and 7. If occasion demands, the inner leading ends 18' are connected by thermal welding, adhesives or the like. The peripheral portions 30 are connected by thermal welding or the like.

Although at least one of the upper and lower filter members 11, 12 is provided with a plurality of radially extending convexo-concaves in the embodiment 5, both the upper and lower filter members 11, 12 may be provided with the same number of convexo-concaves of the same shape substantially at the same positions, and the inner leading ends 17', 18' of the convexo-concaves may abut on each other. In addition, both the filter members may not necessarily be circular and may be square, oblong or in a shape suited for attachment to the fuel tank.

Even though the band-shaped passage 33 of the embodiment 1 has been dispensed with, the outer leading ends of the convexo-concaves especially formed in the upper filter member 11 can function in the same manner as the band-shaped passage 33 due to such a construction. Therefore, air that has entered the inner spaces 14 flows smoothly toward the coupling member 13 via the central inner space.

Figure 12:
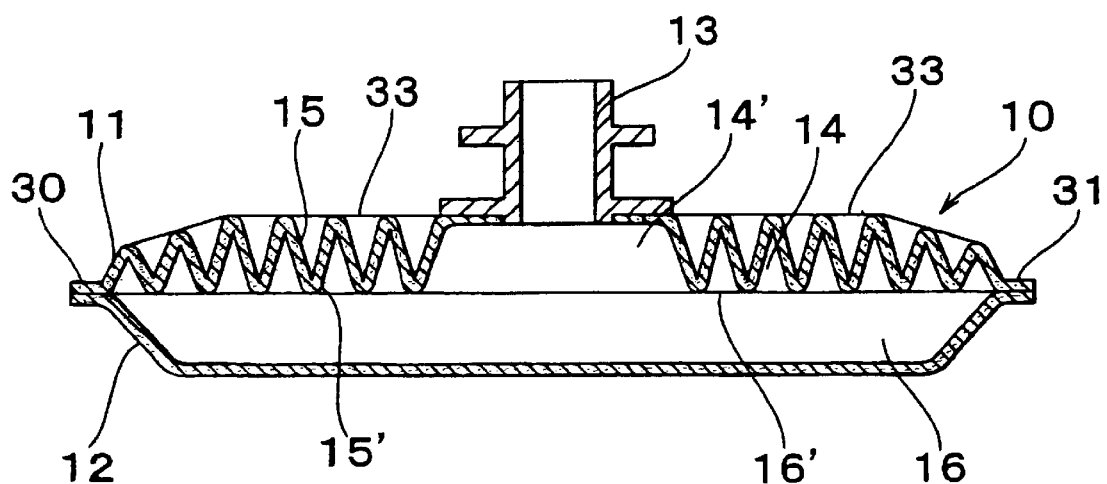
FIG. 12 is a cross-sectional view of a filter according to an embodiment 6 of the invention.

FIG. 12 is a cross-sectional view of the filter according to the embodiment 6 of the invention.

Although two filter members are stuck on each other in the embodiments 1 to 5, the embodiment 6 is characterized in that one filter member is folded back and stuck. In other respects, the embodiment 6 is identical with the embodiment 1.

That is, one oblong filter member is folded back along a central fold-back portion 31 thereof, and the peripheral portions 30 of the other three sides are welded by a thermal welding means such as ultrasonic welding or electrode-position so that the filter 10 having the inner spaces 14 inside is formed.

In this case, convexo-concaves are formed in advance in locations corresponding to the upper and lower filter members 11, 12, and the convexo-concaves formed in the upper filter member 11 and the convexo-concaves formed in the lower filter member 12 intersect with each other while being offset from each other by 90° as is the case with the embodiment 1. Furthermore, the convexo-concave-less central inner space 14' is formed in the central portion of the upper filter member 11. The coupling member 13 is coupled with the central inner space 14', and the convexo-concave-less band-shaped passages 33 are formed in the longitudinal direction of the upper filter member 11 as is the case with the embodiment 1.

Although the convexo-concaves are formed in the upper and lower filter members 11, 12 in the embodiment 6, the embodiment 6 is also applicable to a filter having the dimples 17 shown in FIGS. 4 to 9 instead of the convexo-concaves.

Such a construction makes it possible to easily assemble the filter 10 and reduce the manufacturing costs thereof.

Figure 13:
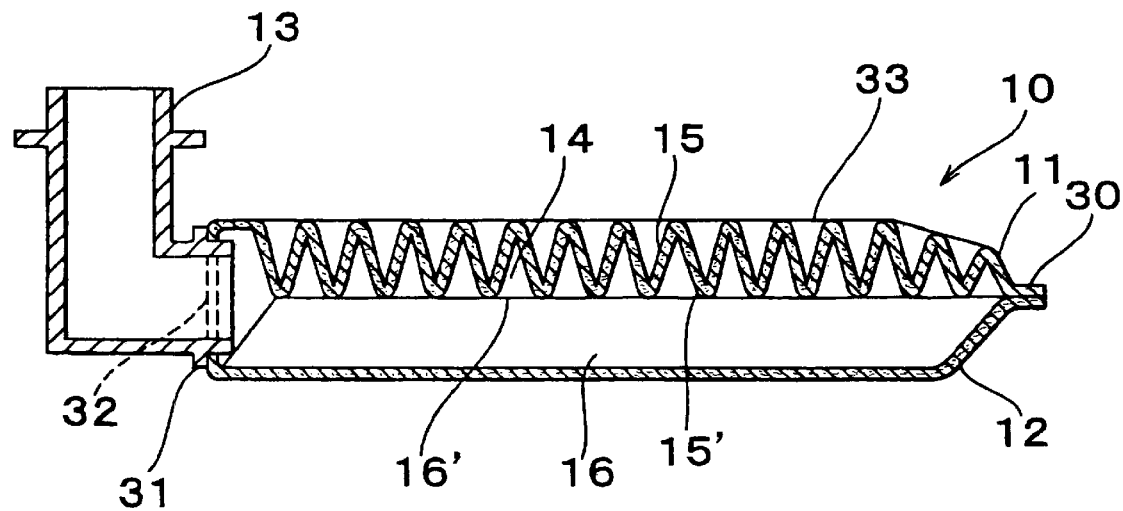
FIG. 13 is a cross-sectional view of a filter according to an embodiment 7 of the invention.

FIG. 13 is a cross-sectional view of the filter according to the embodiment 7 of the invention.

The embodiment 7 is characterized in that one filter member is folded back and stuck and that the coupling member 13 is disposed at the stuck portion of the filter member. The filter member is the same as that of the embodiment 1.

That is, one oblong filter member is folded back along the central fold-back portion 31 thereof, and the peripheral portions 30 of the other three sides are welded by a thermal welding means such as ultrasonic welding or electrode-position so that the filter 10 having the inner spaces 14 inside is formed.

In this case, convexo-concaves are formed in advance in locations corresponding to the upper and lower filter members 11, 12, and the convexo-concaves formed in the upper filter member 11 and the convexo-concaves formed in the lower filter member 12 intersect with each other while being offset from each other by 90°. Furthermore, the convexo-concave-less band-shaped passage 33 is formed in the longitudinal direction of the upper filter member 11.

An opening 32 for connecting the coupling member 13 is made in the fold-back portion 31. The coupling member 13 is inserted into the opening 32 and is connected by thermal welding, adhesives or the like.

Although the convexo-concaves are formed in the upper and lower filter members 11, 12 in the embodiment 7, the embodiment 7 is also applicable to a filter having the dimples 17 shown in FIGS. 4 to 9 instead of the convexo-concaves.

Such a construction makes it possible to easily assemble the filter 10, easily mount the coupling member 13 on the filter 10, and further reduce the manufacturing costs thereof.

Figure 14:
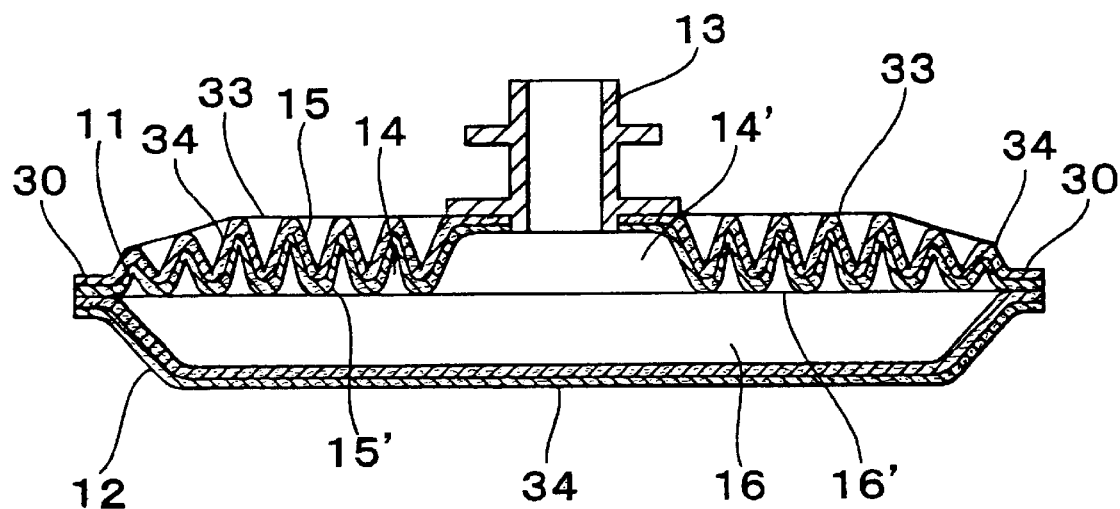
FIG. 14 is a cross-sectional view of a filter according to an embodiment 8 of the invention.
Figure 15:
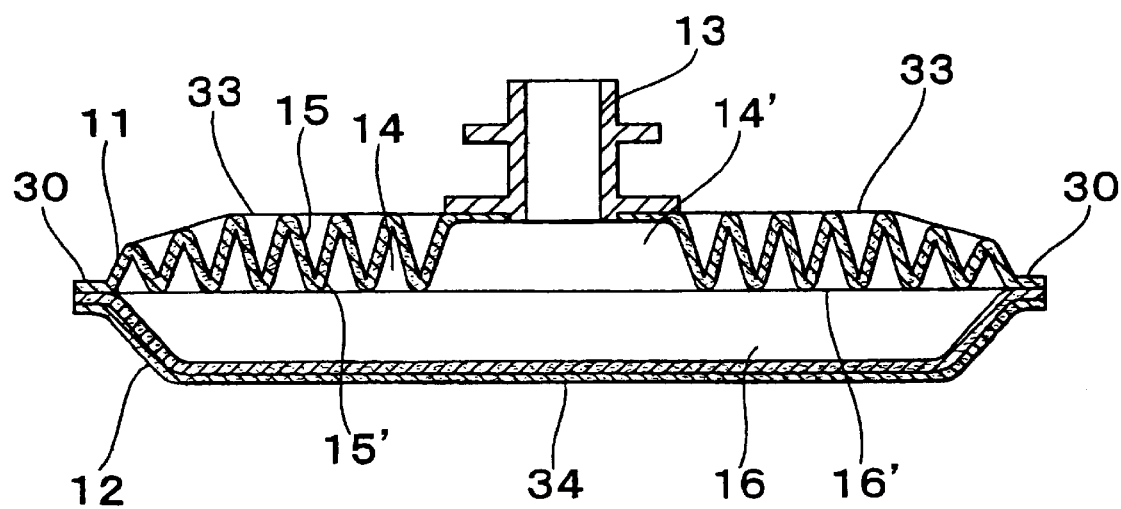
FIG. 15 is a cross-sectional view of a modified filter according to the embodiment 8 of the invention.
Figure 16:
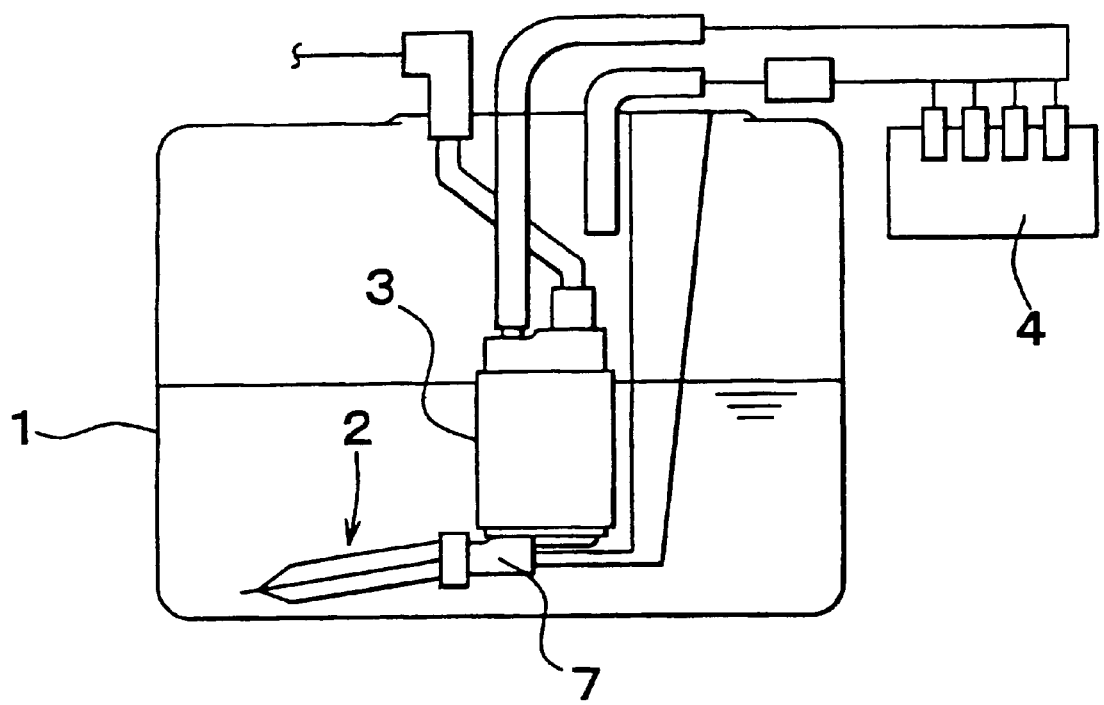
FIG. 16 is a cross-sectional view of an in-tank type fuel filter according to the related art in its mounted state.
Figure 17:
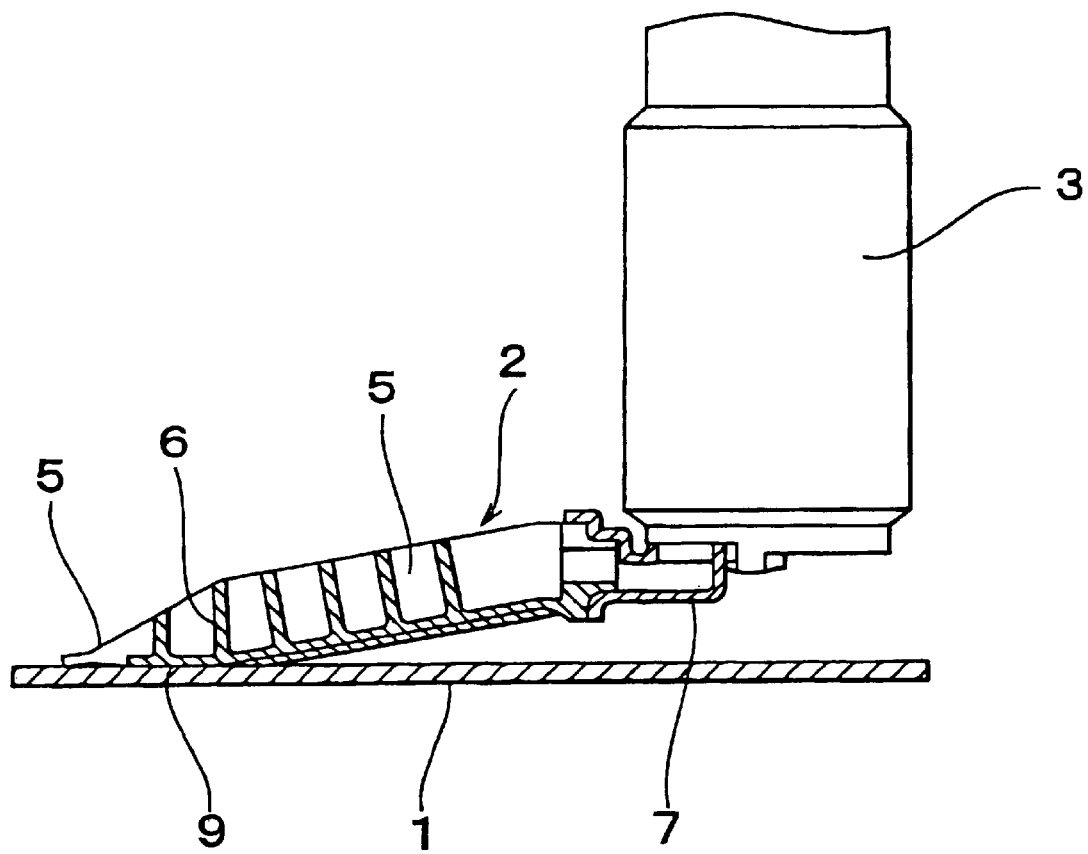
FIG. 17 is a cross-sectional view of the in-tank type fuel filter according to the related art.

FIGS. 14 and 15 are cross-sectional views of the filter according to the embodiment 8 of the invention.

In the embodiment 8, filter members are made from a nonwoven fabric and a mesh screen 34 is stuck on outer surfaces of the filter members. In other respects, the embodiment 8 is identical with the embodiment 1.

As in the description of the embodiment 1, the mixture of a raw fiber and an adhesive fiber that is surface-coated with a low-boiling resin is preferably used as a non-woven fabric from which the filter members are made. However, even though a non-woven fabric made from such substances is used, sufficient durability is not always guaranteed.

Therefore, in the embodiment shown in FIG. 14, when making filter members from a non-woven fabric, a reinforcing material and the mesh screen 34 having a filtering function are stuck on the surface of the non-woven fabric. Thereafter the convexo-concaves 15, 16 are formed, and the upper and lower filter members 11, 12 are made and superposed on each other such that the convexo-concaves 15, 16 intersect with each other while being offset from each other by 90°. If occasion demands, the inner leading ends 15', 16' of the convexo-concaves, i.e., the abutment portions of the filter members 11, 12 as well as the peripheral portions 30 are connected by thermal welding or the like.

The mesh screen 34 may be a synthetic resin that has been coarsely woven for the sake of porosity or a thin flat plate having a multitude of apertures. The convexo-concave-less band-shaped passage 33 is formed in the longitudinal direction of the upper filter member 11 as is the case with the embodiment 1.

In the embodiment shown in FIG. 15, the filter members are made from a non-woven fabric, and the mesh screen 34 is connected only with the outer surface of the lower filter member 12.

That is, the convexo-concaves 15, 16 are formed in the upper and lower filter members 11, 12 and superposed on each other while being offset from each other by 90° as is the case with the embodiment 1. If occasion demands, the filter members 11, 12 as well as the peripheral portions 30 are connected by thermal welding or the like. In connecting the peripheral portions 30, the mesh screen 34 is superposed on the outer surface of the lower filter member 12 so that the mesh screen 34 is also connected simultaneously with the thermal welding of the peripheral portions 30.

In the embodiment shown in FIGS. 14 and 15, the convexo-concave band-shaped passage 33 is formed in the longitudinal direction of the upper filter member 11 as is the case with the embodiment 1.

Such a construction makes it possible to suppress abrasion especially on the outer surface of the lower filter member 12 abutting on the bottom wall of the fuel tank and increase durability thereof.

Although an in-tank type fuel filter installed in a vehicular fuel tank has been described as an example of the embodiments of the invention, the invention should not be limited to the in-tank type fuel filter.

The filter of the invention is composed of a filter member forming at least two opposed faces, an inner space surrounded by the filter member for accumulation of a liquid, and a coupling member establishing communication between the inner space and the outside to deliver the liquid in the inner space to the outside. The liquid is removed of foreign matters by passing through the filter member and is discharged via the coupling member. A plurality of convexo-concaves are provided on at least one face of the filter member. The leading ends of the convexo-concaves on the one face of the filter member are formed generally linearly in a plan view. Because a sufficient inner space can be formed and the filtration area can be increased due to this construction, the intake efficiency of the fuel pump can be enhanced.

Further, the linear leading ends may radially stretch around the coupling member. According to this construction, because fuel and air in the inner space flow smoothly toward the coupling member and especially because air does not dwell inside, the intake efficiency of the fuel pump can further be enhanced.

Further, it is also possible to adopt a construction wherein a plurality of convexo-concaves are provided on the two opposed faces of the filter member, wherein the inner leading ends of the convexo-concaves are jointed, and wherein the leading ends of the convexo-concaves provided on the two opposed faces of the filter member may intersect with each other in a plan view. Due to this construction, the filtration area can further be increased. Also, since the upper and lower filter members are integrated, the rigidity of the entire filter can further be enhanced.

Further, the convexo-concaves of the filter member may be dimples, and the leading ends of the dimples may be jointed with the other inner surface of the filter member or may be jointed with each other. In this construction, the dimples are made for example by pressing protrusions onto the surfaces of flat-shaped filter member, whereby the manufacture thereof can be facilitated in comparison with the filter member that is bent to form convexo-concaves.

Further, two filter members may be connected or one filter member may be folded back and connected. This construction makes it possible to easily manufacture the filter and reduce the costs thereof.

Further, the filter member may be made from filter paper, a non-woven fabric, or both a non-woven fabric with a mesh screen. This construction makes it possible to reduce the weight of the filter, facilitate the manufacture thereof, and reduce the costs thereof.

Further, the mesh screen may be stuck on the surface of the filter member that has not yet been provided with convexo-concaves so that the filter will be formed, or may be connected simultaneously with the connection of the filter member. This construction makes it possible to enhance durability of the filter. Also, since the mesh screen also has the function of filtration, the function of filtration can be improved as a whole. Furthermore, since the mesh screen covers the outer periphery of the filter member pressed onto the bottom wall of the fuel tank, abrasion of the pressed portions can be suppressed.

Further, the non-woven fabric may be the mixture of a raw fiber and an adhesive fiber. Because the rigidity of the filter member can be enhanced due to this construction, durability and processability of the filter can further be enhanced.

Further, the upper filter member may be provided with the coupling member. This construction ensures flexibility in the height direction of the filter member and allows the entire lower filter member to abut on the bottom wall of the fuel tank. Therefore, even if there is a little fuel remaining in the tank, the fuel can be pumped up reliably.

Further, the coupling member may be provided on a lateral face of the filter member. According to this construction, since the coupling member can be mounted on the filter member simultaneously with the welding thereof, the coupling member can be mounted on the filter member with ease.

Further, a passage for preventing accumulation of air may be formed in the filter member. According to this construction, because fuel and air in the inner space flow smoothly toward the coupling member and especially because air does not dwell inside, the intake efficiency of the fuel pump can further be enhanced.

Further, the lower filter member may be provided with buffer agents. Due to this construction, the lower filter member does not come into direct contact with the bottom wall of the fuel tank. Therefore, the lower filter member 12 can be prevented from being abraded or damaged and durability thereof can be increased.

What is claimed is:

1. A filter comprising:
    a filter member forming at least two opposed faces and removing foreign matters from a liquid that has flown through the filter member;
    an inner space surrounded by the filter member for accumulation of the liquid that has been removed of foreign matters by the filter member; and
    a coupling member establishing communication between the inner space and the outside to discharge the liquid in the inner space to the outside, wherein
        a plurality of convexo-concaves are provided on at least one face of the filter member, the inner space and the plurality of convexo-concaves are defined by the filter member only.

2. The filter according to claim 1, wherein
inwardly protruding convexes provided on one face of the filter member abut on the other inner face of the filter member.

3. The filter according to claim 1, wherein
leading ends of the convexo-concaves of the filter member are generally linear in a plan view.

4. The filter according to claim 3, wherein
the linear leading ends radially stretch around the coupling member.

5. The filter according to claim 3, wherein
a plurality of convexo-concaves are provided on each of the two opposed faces of the filter member, and
the linear leading ends of the convexo-concaves provided on one face of the filter member and the linear leading ends of convexo-concaves provided on the other face of the filter member intersect in a plan view.

6. The filter according to claim 3, wherein
a plurality of convexo-concaves are provided on each of the two opposed faces of the filter member, and
the inner leading ends of the convexo-concaves provided on one face of the filter member and the inner leading ends of the convexo-concaves provided on the other face of the filter member are in contact with each other.

7. The filter according to claim 1, wherein
the convexo-concaves of the filter member are dimples.

8. The filter according to claim 7, wherein
leading ends of the dimples provide on one face of the filter member are in contact with the other inner face of the filter member.

9. The filter according to claim 7, wherein
the dimples are provided on the two opposed faces of the filter member, and
leading ends of the dimples provided on one face of the filter member and leading ends of the dimples provided on the other face of the filter member are in contact with each other.

10. The filter according to claim 1, wherein
the filter member has a first filter member having a first face and a second filter member having a second face opposed to the first face, and is made by connecting the first and second filter members.

11. The filter according to claim 1, wherein
one filter member is folded back so that the filter member forms two mutually opposed faces.

12. The filter according to claim 1, wherein
the filter member is made from filter paper.

13. The filter according to claim 1, wherein
the filter member is made from a non-woven fabric.

14. The filter according to claim 13, wherein
the non-woven fabric is the mixture of a raw fiber and an adhesive fiber.

15. The filter according to claim 1, wherein
the filter member is made from a non-woven fabric and a mesh screen.

16. The filter according to claim 15, wherein
the non-woven fabric is the mixture of a raw fiber and an adhesive fiber.

17. The filter according to claim 16, wherein
the mesh screen is stuck on the surface of the filter member that has not yet been provided with convexo-concaves.

18. The filter according to claim 16, wherein
the mesh screen is connected simultaneously with the connection of the filter member.

19. The filter according to claim 1, wherein
the filter member includes an upper filter member and a lower filter member, and
the upper filter member is provided with the coupling member.

20. The filter according to claim 1, wherein
the coupling member is provided on a lateral face of the filter member.

21. The filter according to claim 1, wherein
a passage for discharging air in the inner space to the coupling member is formed in the filter member.

22. The filter according to claim 1, wherein
the filter member includes an upper filter member and a lower filter member, and
buffer agents are provided on an outer surface of the lower filter member.

23. The filter according to claim 1, wherein
the filter is provided upstream of a fuel pump.

* * * * *